Figure 1:
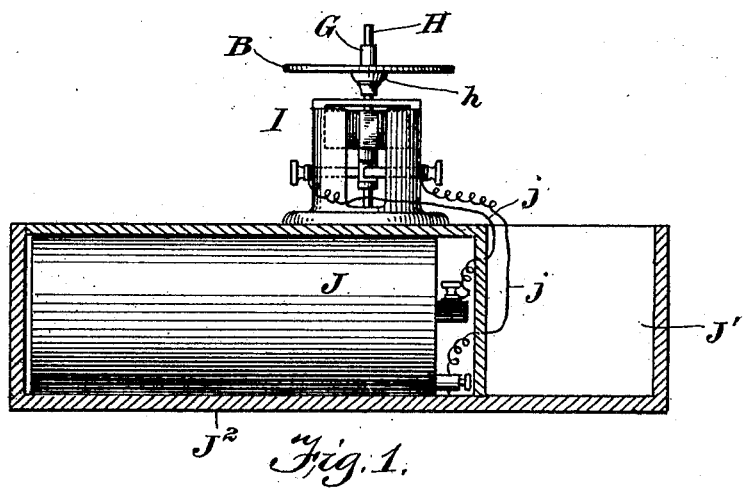

No. 871,542. PATENTED NOV. 19, 1907.
R. L. WATKINS,
HEMOGLOBINOMETER.
APPLICATION FILED APR. 11, 1906.

2 SHEETS—SHEET 1.

WITNESSES
Robert Head
V. E. Nichols

INVENTOR
Robert L. Watkins,
BY Griffin & Bernhard
ATTORNEYS

No. 871,542. PATENTED NOV. 19, 1907.
R. L. WATKINS.
HEMOGLOBINOMETER.
APPLICATION FILED APR. 11, 1906.

2 SHEETS—SHEET 2.

WITNESSES
Robert Head
V. E. Nichols

INVENTOR
Robert L. Watkins
BY
Griffin Bernhard
ATTORNEYS

UNITED STATES PATENT OFFICE.

ROBERT L. WATKINS, OF NEW YORK, N. Y.

HEMOGLOBINOMETER.

No. 871,542.  Specification of Letters Patent.  Patented Nov. 19, 1907.

Application filed April 11, 1906. Serial No. 311,365.

*To all whom it may concern:*

Be it known that I, ROBERT L. WATKINS, a citizen of the United States, residing at New York, borough of Manhattan, in the county of New York and State of New York, have invented a certain new and useful Hemoglobinometer, of which the following is a specification.

This invention relates to an apparatus for testing blood, and more particularly to an apparatus for determining the percentage of hemoglobin in the blood.

One embodiment of the invention comprises a rotatable member of a selected color, a dial or scale, and an adjustable member of a different color from that of the rotatable member, and contacting therewith, said adjustable member being adapted to cover more or less of the colored surface of the rotatable member, the whole being adapted for continuous rotation. When the device is operated, the contrasting colors of the aforesaid members will appear to blend when the parts are rotated at a certain speed, whereby a drop of blood to be tested may be compared with the apparently blended color of the rotating devices, and the percentage of hemoglobin determined by reference to the scale when the blended color of said rotative apparatus appears to the eye to be the same as that of the blood undergoing the test.

In another embodiment of the invention, the rotatable member is mounted on a hollow spindle which is adapted to be placed on a shaft, the latter being driven by a suitable motor, whereby the device may be connected removably to said shaft. The colored part of the rotatable member has a radial slot, and between the base and the said slotted member is fitted the adjustable member, the latter being capable of adjustment through the aforesaid slot for the purpose of covering more or less of the surface of the colored rotative member.

The specific embodiment of the invention just described involves a construction wherein the rotary device must be stopped and the movable member adjusted by hand in order to shift said adjustable part relative to the scale and the slotted member. In practice it may be necessary to stop and adjust the device a number of times before the apparently blended color of the rotary device is the same, or substantially the same, as the blood being tested, the position of the adjustable member relative to the scale indicating the percentage of the hemoglobin in the blood.

A further feature of the invention involves means for adjusting one color member relative to the other while the members are in motion, thus making it unnecessary to stop the device for the purpose of adjustment, and thereby providing means whereby the percentage of hemoglobin may be ascertained easily and quickly.

According to the latter embodiment of the invention, I employ a hollow shaft, a sleeve or thimble on said shaft, means connecting the shaft and the sleeve to make the parts rotate simultaneously and also to compel one part to turn on the other independently of the rotary motion of the connected parts, means for adjusting the hollow shaft endwise, a member revoluble with the shaft, and another member controllable by the endwise adjustment of the shaft so as to cover more or less of the colored surface of the first named member, whereby the blended color of the two rotating members may be changed without stopping the device.

Figure 2:
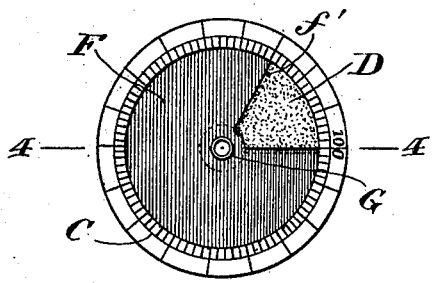
Figure 3:
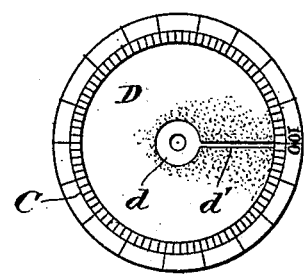
Figure 4:
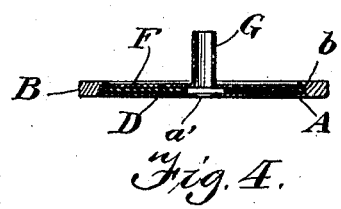
Figure 5:
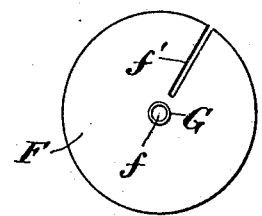
Figure 6:
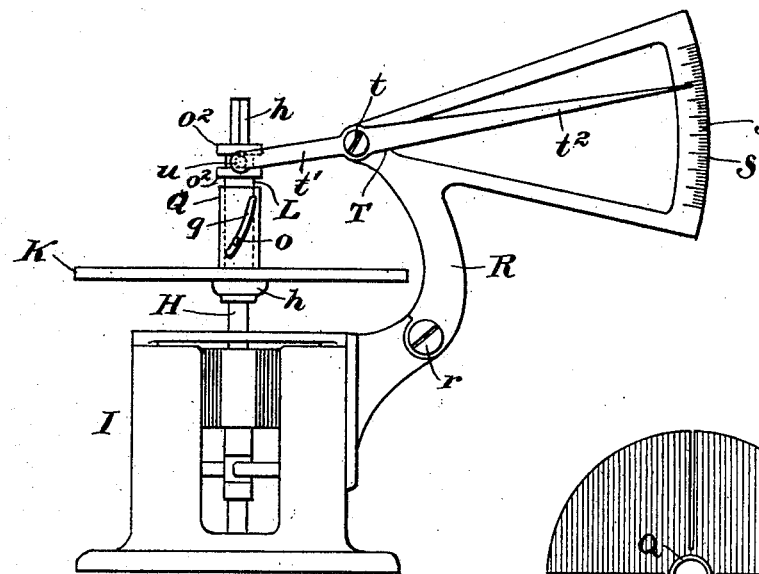
Figure 8:
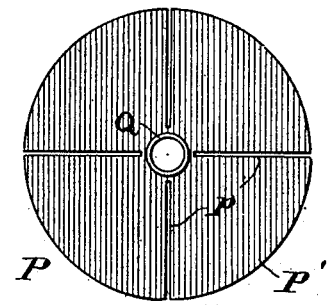
Figure 7:
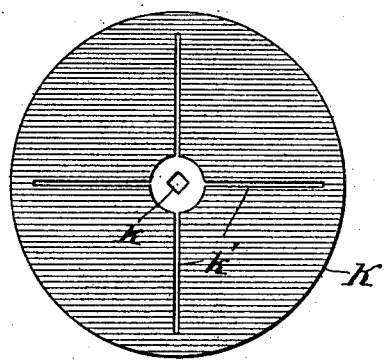
Figure 9:
Figure 10:
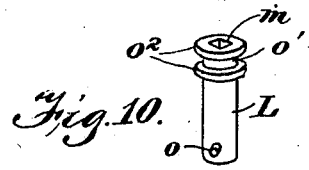

In the drawings Figure 1 is a side elevation of a complete apparatus wherein the testing device is adapted to be driven electrically; Fig. 2 is a plan view showing one form of my improved testing device; Fig. 3 is another plan view showing the rotary member, the adjustable member being omitted; Fig. 4 is a vertical cross section on the line 4—4 of Fig. 2; Fig. 5 is a plan view of the adjustable member; Fig. 6 is a side elevation of a testing device wherein the adjustable part may be shifted while the rotary device is in motion; Fig. 7 is a plan view of one rotary member of the testing device; Fig. 8 is a plan view of the other rotary member of said testing device; Fig. 9 is a side elevation of the device shown by Fig. 8; and Fig. 10 is a detail perspective view of a means for adjusting the device shown by Figs. 8 and 9.

I will first describe the construction of the testing device represented by Fig. 1 to 5, inclusive.

A designates a base which is preferably in the form of a disk. As shown, said base has an enlarged rim B, which is integral with the base A, although the rim may be made separate from the base and secured thereto in any approved way. Said rim is provided on its inner edge with a circumferential recess *b*, and the rim is, furthermore, provided with graduations on its upper face, said graduations being calibrated to read from 1 to 100, the calibrations being in groups of five, for conveniently reading the scale C. The calibration of the scale is arbitrary, 100 being supposed to represent the color of healthy blood, with a high percentage of the red corpuscles.

D indicates one member of the testing device which is in the form of a disk fitted within the recess *b* of the rim, and arranged parallel to the base A. The member D may be attached to the rim in any suitable or approved way, so that it will rotate with the base, said member being fixed relative to the base. The member D has its exposed upper surface colored, substantially, to the hue of blood having a low percentage of the red corpuscles, and in practice I have found a salmon color to answer the purpose of the invention, although it will be understood I do not desire to confine myself to this particular shade or tint for the member D.

By reference to Fig. 4, it will be seen that the member D is a short distance above the base A to leave a narrow space between said member, D, and the aforesaid base. The member D is provided with a central opening *d*, and a radial slot *d'*, the latter extending outwardly from the opening *d*, substantially to the edge of the member D.

F designates an adjustable member which consists of a disk of pliable material, substantially in the form shown by Fig. 5. Said disk F constitutes the other member of the testing device, and it is essential that this disk shall be of a color which contrasts with that of the member D. The disk or member F is preferably of a deep red color, corresponding, substantially, to the color of the blood having a high percentage of red corpuscles; in fact, I prefer to use a disk or member F having a deep red color representing a standard color of the blood which is rated at 100 percent. The disk F has a central opening *f*, and a radial slit *f''*, thus enabling the edges of the disk adjacent to the slit *f''* to be easily separated. Said disk F is fitted between the base A and the member D, whereby it is held or confined on parts A, D, so as to make it rotate with the aforesaid parts without disturbing its position. The member or disk F may be housed or contained wholly within the rim B, and the member D, but one edge of the member F may be separated along the line of the slit *f''*, and drawn through the radial slot *d'* of the member D. This construction enables the standard color disk or member F to be withdrawn more or less from beneath the slotted member D, whereby the member F when partly withdrawn may overlie the member D to any desired extent, as, for example, the member F may be withdrawn to cover three-fourths of the surface of the member D, as shown by Fig. 2, although when the device is not in use said member F may lie wholly within or below said member D, as in Fig. 3. The member F is adjusted by turning it within the rim B of the testing device, and the radial exposed edge of this member F is adapted to lie opposite to the graduations on the scale C, whereby the percentage of hemoglobin in the blood may be ascertained by reading the scale C when the apparently blended color of the contrasting disks D, F, appears to the eye to be of the same color as that of the specimen of blood under examination.

Any suitable means may be provided for giving rotary motion to the testing device to make the colors of the disks D, F, appear to the eye as a single blend. As shown, the device is provided with a thimble, or sleeve G, which may be attached to, the member D, in which case the base A has an opening *a'*, whereby the testing device may be slipped upon a motor driven shaft H, as in Fig. 1. The sleeve G may, however, be attached or connected with the base A in any suitable or preferred way, and, if desired, any other means may be adopted for mounting the testing device on a suitable shaft.

In Fig. 1, the shaft H is provided with a collar *h*, on which is adapted to rest the base A of the testing device. The shaft is driven by an electric motor I, the field of which is energized by the current from a battery J, suitable conductors *j* being provided for conveying the current from the battery to the field of the motor. The motor with the testing device mounted thereon is adapted to be placed in a chamber J' of a suitable receptacle J², when it is not desired to use the apparatus, but, as shown by Fig. 1, the motor and the testing device may be withdrawn from the chamber J' and placed upon the receptacle J², thus disposing the apparatus for convenient observation.

To use my device, the motor I is placed on the receptacle J², and the testing device is fitted on the shaft H, so that the base A will engage with the collar *h*. A drop of the blood to be tested is deposited on white blotting paper or its equivalent, and the disk or member F is withdrawn partly through the slot *d'* of the member D, thus making a part of the disk F cover the disk D. Rotary motion is given to the testing device by the motor shaft, and when said device rotates at a certain speed the colors of the members D, F, will appear to the eye to blend into one color. Comparison is made by the operator of the blended color of the testing device with the blood under examination, and if there is an apparent difference between the two colors the testing device is withdrawn from the motor shaft, and the disk or member F adjusted over the member D, more or less as the judgment of the operator may dictate. The testing device is now replaced on the shaft and further comparison is made. If the two colors are apparently the same, the operator may withdraw the testing device and determine the percentage of hemoglobin in the blood by reading the scale C, the exposed radial edge of the member F being used as an index. It is evident that the disk F may require adjustment a number of times before the operator can determine the percentage of hemoglobin in he blood.

Although I have shown and described my testing device as adapted to be driven by an electric motor, it will be understood that any other form of motor, such as a spring driven clock motor, or a weight driven motor may be employed.

In Figs. 6 to 10, inclusive, I have represented another embodiment of the invention wherein the adjustable member may be shifted over the companion member without stopping the rotation of the testing device. Said embodiment of the invention discloses an electrically driven motor I, the shaft H of which is provided with a collar. Above this collar, the shaft H is polygonal or square, as at $h'$, and on the square part of the shaft is a member K, the surface of which is salmon-colored, or any other appropriate color may be given thereto. Said member has a square opening $k$, which enables it to fit on the square part $h'$ of the shaft H, thus insuring the rotation of the member K with the shaft. The member K rests on the collar $h$, and, if desired, said member may be easily withdrawn from the square part of the motor shaft. As shown by Fig. 7, the member K is in the form of a hollow or chambered disk, and it is provided in its upper side with a plurality of radial slots $k'$, the latter being, preferably, four in number.

L designates a hollow shaft having an axial bore $m$, which is square in cross-section, whereby said hollow shaft fits snugly to the square part $h'$ of the motor, for the purpose of making the shaft L rotate with said motor shaft, and, at the same time, allow it to be adjusted endwise thereon. The shaft L is provided near its lower part with a stud or pin $o$, and the upper part of the shaft has an annular groove $o'$ between concentric flanges $o^2$, see Fig. 10.

P designates an adjustable member provided with a sleeve or hub Q, the member and the sleeve being in one piece, or united rigidly to each other in any approved way. The member P is in the form of a disk, colored to the hue of the standard blood color, thus making the member P contrasting in color to the member K. Said member P is of pliable material, and it has a plurality of radial slits or incisions $p$, thus dividing the member P into a plurality of quadrant shaped wings P', see Fig. 8. The member P fits within the hollow member K or below the slotted upper part of said member K, and the edges of the wings P' are adapted to be separated along the slits $p$, for the purpose of partially withdrawing said wings P' of the member P through the radial slots $k'$ in the upper part of the member K, whereby the wings P' may partially overlie the colored surface of the member K. The sleeve Q is provided with a spiral slot $q$, and said sleeve is fitted on the shaft L below the collar $o^2$, whereby the stud $o$ of said shaft L fits in the slots $q$, for the purpose of operatively connecting the parts L, Q. The sleeve Q and the member P are made to rotate with the shaft L and the member K, but the part L is adapted to have endwise movement with respect to the part Q, whereby the stud $o$ is adapted to operate on the edges of the spiral slot $q$, for the purpose of turning the sleeve Q more or less on the endwise movable member L, whereby the adjustment of said member L operates to turn the sleeve Q and the member P, for the purpose of making the wings P' cover more or less of the surface of the member K.

In Fig. 6 I have shown one embodiment of means for giving endwise adjustment to the shaft or member L, without stopping the motor and the testing device. An arm R has pivotal connection at $r$, with the frame of the apparatus, said pivot $r$ being in the form of a clamping screw. The arm R is formed with a bar $s$, which is graduated to produce the scale S, the latter being calibrated to read from 15 to 100. On the arm R is mounted a combined adjusting lever and index T, the latter being pivoted as at $t$, on the arm R, to provide a short arm $t'$, and another arm $t^2$. The short arm $t'$ is forked to embrace the grooved part $o'$ of the member L, said fork of the arm $t'$ being provided with a pin or studs $u$, adapted to fit in the groove $o'$. The long arm $t^2$ is adapted to traverse the scale S, and to serve as an index. With the index T adjusted to the upper part of the scale S, the wings P' of the member P are exposed very little above the slotted member K, whereby the blended color of the contrasting member K, P, will indicate a low percentage of hemoglobin in the blood under examination. Should the blended color of the testing device be below the color of the blood under examination, the operator may move the lever T, so as to raise the member L, and make its stud $o$ operate on the slotted sleeve Q to turn the latter, whereby the wings P' of said member P will be projected further through the slots $k'$ of the member K. It is evident that the wings P' may be made to overlap the member K to any desired extent, without stopping the rotation of the testing device, and the adjustment of the member P will be indicated by the index $t^2$, for the purpose of reading the percentage of hemoglobin on the scale S.

Changes in the form, size, proportion, and minor details in construction may be made without departing from the spirit of the invention or sacrificing any of the advantages thereof, and I, therefore, reserve the right to make such alterations and modifications as fairly fall within the scope of my invention.

Having thus described my invention, what I claim as new and desire to secure by Letters Patent is:—

1. In a device of the class described, two contrasting color members adapted to be adjusted relatively to each other so as to expose variable parts of each member, means for rotating the members, and means for indicating the relative adjustment of the members while said members are rotating.

2. In a device of the class described, rotatable members of contrasting colors, one member being adjustable relative to the other, means for adjusting one member without arresting the members, and means independent of the color members for indicating the relative adjustment of said members.

3. In a device of the class described, rotatable members of contrasting colors, said members being in contact and one of them being adjustable relative to the other, means for adjusting one member without arresting the members, and means for indicating the said adjustment.

4. In a device of the class described, rotatable members of contrasting colors, one member having a plurality of slots and the other member being provided with wings which are movable in said slots.

5. In a device of the class described, rotatable members contrasting in color, normally revolving at the same speed, and adjustable relative to one another, means for securing such adjustment while the members are in motion, and means for indicating the relative adjustment of said members.

6. In a device of the class described, rotatable members of contrasting colors, the said members being adjustable relative to each other, and a third member coöperating with one of said rotatable members for partially moving it around its axis, thereby adjusting it relative to the other rotatable member while both of the rotatable members are revolving.

7. In a device of the class described, rotatable members of contrasting colors and adjustable with respect to each other, means rotating with said members for adjusting one relative to the other, and means for indicating such relative adjustment of the members.

8. In a device of the class described, rotatable members adjustable relative to one another, means for adjusting one member relative to the other, and means for indicating such relative adjustment of the members.

9. In a device of the class described, concentric sleeves connected for simultaneous rotation, means for turning one sleeve by the endwise movement of the other, and rotatable members of contrasting colors, one of said members being adjusted by the turning movement of the aforesaid sleeve, and means for indicating the relative adjustment of one member to the other member.

10. In a device of the class described, concentric parts, means for turning one of said parts by the endwise movement of the other part, a rotatable slotted member, another rotatable member connected with the turning part, and indicating means for giving endwise movement to the aforesaid part.

11. A hemoglobinometer comprising two contrasting color members contacting with each other and adapted to be adjusted relatively to each other, automatic means for continuously rotating said members at the same speed, said automatic means being provided with a shaft, a hollow spindle carrying one of said color members and supported by said shaft, and means for indicating the relative adjustment of said members.

In testimony whereof I have signed my name to this specification in the presence of two subscribing witnesses.

ROBERT L. WATKINS.

Witnesses:
JAS. H. GRIFFIN,
H. I. BERNHARD.